United States Patent
Walsh et al.

(10) Patent No.: US 8,617,331 B2
(45) Date of Patent: Dec. 31, 2013

(54) METHOD AND APPARATUS TO REPAIR FLEXIBLE FIBER-REINFORCED PIPE

(75) Inventors: Thomas J. Walsh, Houston, TX (US); Richard Matthew Lutz, Houston, TX (US); Michael J. Bryant, Scotland, GA (US); Ali Bryant, Scotland (GB); Michael Alan Seymour, Katy, TX (US)

(73) Assignee: DeepFlex Inc., Houston, TX (US)

( * ) Notice: Subject to any disclaimer, the term of this patent is extended or adjusted under 35 U.S.C. 154(b) by 0 days.

(21) Appl. No.: 13/255,702

(22) PCT Filed: Mar. 10, 2010

(86) PCT No.: PCT/US2010/026812
§ 371 (c)(1),
(2), (4) Date: Sep. 9, 2011

(87) PCT Pub. No.: WO2010/104941
PCT Pub. Date: Sep. 16, 2012

(65) Prior Publication Data
US 2012/0000596 A1   Jan. 5, 2012

Related U.S. Application Data

(60) Provisional application No. 61/159,373, filed on Mar. 11, 2009.

(51) Int. Cl.
*B29C 73/10*   (2006.01)
(52) U.S. Cl.
USPC ........................ 156/94; 156/308.2; 156/293
(58) Field of Classification Search
USPC ................. 156/153, 258, 308.2, 98, 95, 293
See application file for complete search history.

(56) References Cited

U.S. PATENT DOCUMENTS

| | | | |
|---|---|---|---|
| 6,174,392 B1 * | 1/2001 | Reis | 156/58 |
| 6,491,779 B1 | 12/2002 | Bryant | |
| 6,562,426 B1 * | 5/2003 | Kamiyama et al. | 428/36.9 |
| 6,804,942 B2 | 10/2004 | Bryant | |
| 7,254,933 B2 | 8/2007 | Bryant | |
| 2007/0125437 A1 * | 6/2007 | Lazzara | 138/99 |

(Continued)

FOREIGN PATENT DOCUMENTS

| | | | |
|---|---|---|---|
| JP | 2000-055289 A | 2/2000 | |
| JP | 2003-113962 A | 4/2003 | |

(Continued)

OTHER PUBLICATIONS

International Search Report issued in PCT/US2010/026812, mailed on Oct. 26, 2010, 2 pages.

(Continued)

*Primary Examiner* — Yogendra Gupta
*Assistant Examiner* — Vishal I Patel
(74) *Attorney, Agent, or Firm* — Osha Liang LLP (57) ABSTRACT

Embodiments disclosed herein relate to one or more embodiments of and methods to repair a flexible pipe. A method to repair damaged flexible fiber-reinforced pipe which includes a plurality of helically-wrapped stacks of laminated strips of material is disclosed. The method includes removing a portion of existing stacks from a damage location, applying an adhesive to a surface of replacement stacks, installing the replacement stacks to the damage location, binding the replacement stacks to remaining existing stacks with the applied adhesive, and installing a replacement jacket over the replacement stacks.

21 Claims, 11 Drawing Sheets

(56) References Cited

U.S. PATENT DOCUMENTS

| | | | |
|---|---|---|---|
| 2009/0038738 A1* | 2/2009 | Nakamura | 156/94 |
| 2009/0053406 A1* | 2/2009 | Ackerman | 427/142 |
| 2009/0054406 A1 | 2/2009 | Ward et al. | |
| 2010/0154913 A1* | 6/2010 | Brooks et al. | 138/99 |
| 2012/0132344 A1 | 5/2012 | Deleris et al. | |

FOREIGN PATENT DOCUMENTS

| | | | |
|---|---|---|---|
| JP | 2008-025807 A | 2/2008 | |
| JP | 2008-157368 A | 7/2008 | |
| JP | 2008-309256 A | 12/2008 | |
| WO | 2006-116593 A1 | 11/2006 | |
| WO | 2008-135856 A2 | 11/2008 | |

OTHER PUBLICATIONS

Written Opinion issued in PCT/US2010/026812, mailed on Oct. 26, 2010, 4 pages.

Examination Report Issued in Austrailian Application No. 2010224241; Dated: Feb. 7, 2013 (3 pages).

European Search Report issued in European Application No. 10751348.3 mailed Jun. 14, 2013 (4 pages).

Office Action Issued in Chinese Application No. 201080020406.6, Dated: Apr. 2, 2013 (10 pages with English Translation).

2nd Office Action in corresponding Chinese Application No. 201080020406.6, dated Sep. 23, 2013 (8 Pages).

* cited by examiner

METHOD AND APPARATUS TO REPAIR FLEXIBLE FIBER-REINFORCED PIPE

CROSS-REFERENCE TO RELATED APPLICATIONS

This Application claims priority from Application 61/159,373, filed on Mar. 11, 2009, in the United States.

BACKGROUND OF THE DISCLOSURE

1. Field of the Disclosure

The present disclosure relates to flexible composite pipe for conducting petroleum or other fluids subsea or on land and a method of repairing the same.

2. Description of the Related Art

A composite flexible may be formed in part from composite tape stacks. Composite tape stacks may be formed from a plurality of thin tape strips. The composite tape stacks may then be helically wound onto a pipe structure. During operation a pipe may be damaged, which may result in a stopping of production and/or operation so that a repair or replacement of the damaged pipe may be made.

SUMMARY OF THE CLAIMED SUBJECT MATTER

In one aspect, the present disclosure relates to a method to repair damaged composite flexible pipe. Embodiments disclosed herein relate to one or more embodiments of and methods to repair a flexible pipe. A method to repair damaged flexible fiber-reinforced pipe which includes a plurality of helically-wrapped stacks of laminated strips of material is disclosed. The method includes removing a portion of existing stacks from a damage location, abrading a surface of replacement stacks to be installed at the damage location, applying an adhesive to the abraded surface of the replacement stacks, installing replacement stacks to the damage location, binding the replacement stacks to remaining existing stacks with the applied adhesive, and installing a replacement jacket over the replacement stacks.

BRIEF DESCRIPTION OF THE DRAWINGS

Features of the present disclosure will become more apparent from the following description in conjunction with the accompanying drawings.

DETAILED DESCRIPTION

A flexible pipe and a method of repairing the same, according to embodiments of the present disclosure, will be explained hereinafter by referring to the accompanying drawings.

The present disclosure may comprise a repair method for composite pipe similar to that disclosed in U.S. Pat. No. 6,491,779, filed on Apr. 24, 2000, entitled "Method of Forming a Composite Tubular Assembly," U.S. Pat. No. 6,804,942, filed on Sep. 27, 2002, entitled "Composite Tubular Assembly and Method of Forming Same," and U.S. Pat. No. 7,254,933, filed on May 6, 2005, entitled "Anti-collapse System and Method of Manufacture," all of which are hereby incorporated by reference in their entireties. The method may also be suitable for repairing any bonded or unbonded flexible pipe structure that employs composite materials for hoop reinforcement and/or tensile reinforcement.

During installation and in service, damage may occur to the exterior of flexible pipes. Often this damage may be to hoop or tensile reinforcement layers beneath an outer jacket. One or more embodiments of the present disclosure are related to repair procedures directed to repair the hoop or tensile reinforcement layers of a composite flexible pipe in-situ, thereby reducing the amount of time a rig may be delayed from production and/or operation.

Figure 1:
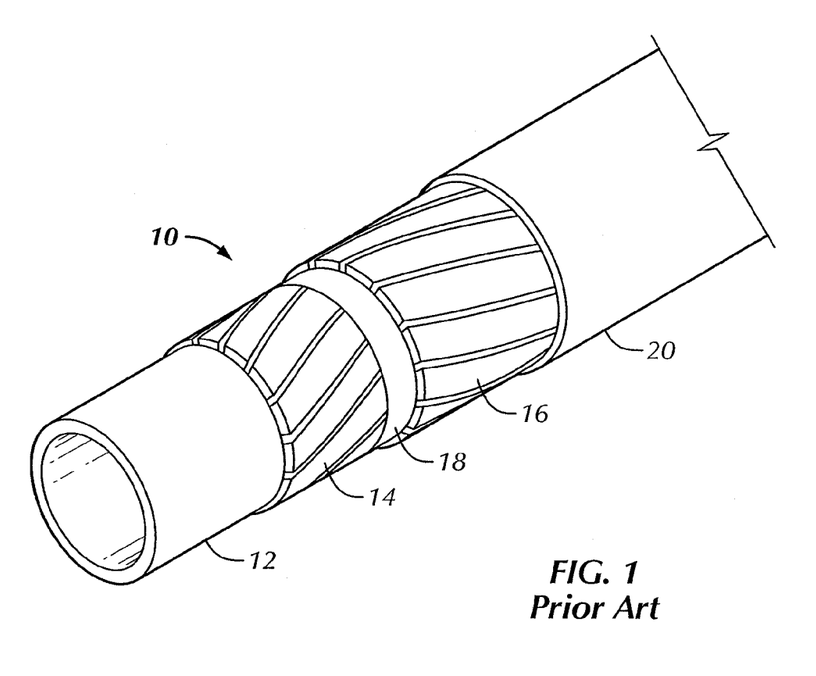
FIG. 1 shows an isometric view of a composite flexible pipe.

Referring initially to FIG. 1, an isometric view of a composite flexible pipe 10 is shown. A pipe structure 12 may be helically wrapped with a first layer of composite tape stacks 14 in a first orientation and a second layer of composite tape stacks 16 which may be counter wound with respect to stacks 14 in an opposite orientation. An anti-abrasive layer 18 may be disposed between stacks 14 and stacks 16 and a jacket 20 may cover the layers of the pipe 10 to provide external protection. Although FIG. 1 depicts a relatively simple composite pipe structure 10, those skilled in the art will appreciate that a composite pipe 10 may include additional and/or different layers, including liners, hoop-stress reinforcement layers, anti-wear layers, lubricating layers, tensile reinforcement layers, anti-extrusion layers, membranes, and/or any other layers as may be included in a composite flexible fiber-reinforced pipe.

The stack layers 102 and 104 may comprise helically wrapped stacks of laminated material. The stacks may be made of non-metallic fiber-reinforced tapes that may be laminated and bonded together as a single structural member. The individual layers of the stacks may include UD (unidirectional) tape or other structural and/or reinforced tape.

The repair methods as described in embodiments of the present disclosure may be performed when an outer jacket and one or more layers of helically wrapped stacks that may include the hoop and/or tensile reinforcement layers are damaged.

Figure 2:
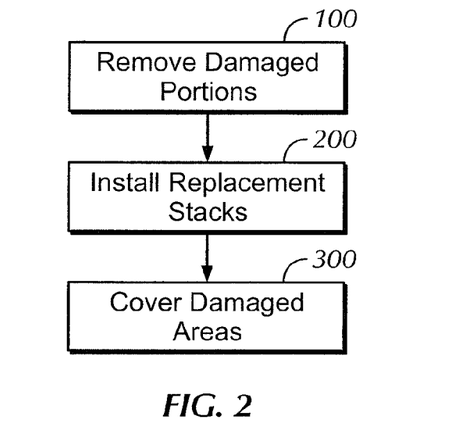
FIGS. 2 through 7 show multiple flow charts of procedures to repair a flexible pipe in accordance with one or more embodiments of the present disclosure.

Generally, referring to FIG. 2, embodiments of the present disclosure may include a process of removing damaged stacks 100, a process of installing replacement stacks 200, and a process of sealing and/or covering the damaged area 300. If performing the repair in-situ, any or all operational or installation loads may be removed from the damaged section of pipe, which may include pressure loads, bending loads, tension loads, torque loads, and/or any other loads that may be acting on the damaged area of pipe. Furthermore, the composite pipe may be stabilized and any stored energy may be released and/or controlled, and the pipe may be removed from service and all valves and flow prevention devices and/or methods may be activated.

Reference may be made to the following terms throughout the present disclosure. A tape stack refers to stacks of composite material that may be attached to a pipe and may form the pipe structure. As noted, a tape stack may include one or more non-metallic fiber-reinforced tapes. Undamaged stack refers to tape stacks that are still attached to the pipe but have not been damaged. Undamaged stacks may include tape stacks that have a damage portion removed therefrom. A damaged stack refers to a portion of the tape stack that may have suffered damage. A replacement stack refers to a stack of composite material the same as or similar to the composition of the tape stack. The replacement stack may be a partial length of tape stack. Barrier tape may be a tape that may allow for relative movement between layers that may be on each side of the barrier tape layer. Barrier tape may also provide protection to surfaces to which it may be applied.

Further, U-tape may be made of the same tape as that barrier tape, or may be a different tape such as a "Z" shaped, or "Z-tape" used in the manufacture of composite flexible pipe. The U-tape may not have a "U" shape as manufactured, but may be manipulated into forming a "U" shape. Accordingly, the U-tape may be provided from a roll or sheets of tape and then manipulated during installation into a "U" shape. A single strip may be a single strip of the material which makes up the tape stacks or replacement stacks, such as a strip of UD tape or other fiber-reinforced non-metallic tape strip. As described above, the tape stacks and replacement stacks may be made of multiple layers which may be similar to the single strip. A protective layer may be a tape layer or an applied paste, gel, or other material which may provide a sealing layer and/or a binding layer or may be made from the barrier tape. A jacket may be made from extruded material, and the replacement jacket may be a portion of a jacket. The replacement jacket may be welded to the undamaged outer jacket of the pipe. The replacement jacket may also be a helical tape wrap applied externally to the undamaged jacket, covering the damaged section. The replacement jacket may also be a heat shrink tube or heat shrink wrap applied externally to the undamaged jacket, covering the damaged section. A protective exterior wrap may be a tape layer applied to the surface of the pipe or may be shrink-wrap and/or self-adhering tape, such as ethylene propylene copolymer tape. Adhesives may be epoxies, epoxy resins, and/or other binding agents and/or materials known in the art.

Figure 3:
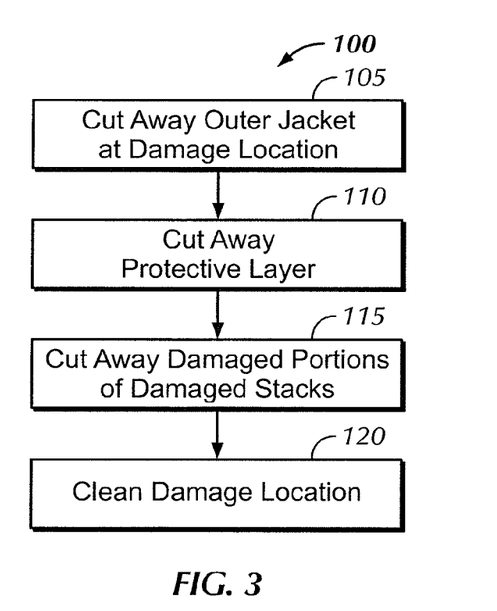

Referring now to FIG. 3, an exemplary process to remove damaged stacks 100 in accordance with one or more embodiments of the present disclosure will be described. Specifically, an outer jacket that may be damaged may be removed at step 105. To remove an appropriate amount of jacket around the damage location a strap may be applied to the surface of the pipe above and/or below the area to be removed. The strap may be used to serve as a guide for marking and cutting throughout the repair. Chalk, wax pencil, or other suitable markings may be made to the exterior of the pipe to outline or demark the desired area for repair. To remove the outer jacket a hot knife may be used to cut through the material of the outer jacket. Alternatively, a circular saw, utility knives, or other cutting instruments may be used to cut away the damaged area of the outer jacket. When cutting into the jacket, it may be desired that the cuts do not cut too deep and do not impact a first layer under the jacket. After removal of any damaged portions of the jacket a jacket window may be formed. The jacket window may be defined by the edge of the undamaged jacket that remains surrounding the damaged area of the pipe. The jacket window may allow access to damaged layers of the pipe. Further, an edge of the jacket window may be a distance away from the damaged stacks. The distance may be such as to allow for some manipulation of the undamaged portions of the tape stacks (i.e., undamaged stacks).

Next, at step 110, a protective layer that may be the first layer beneath the jacket may be removed from around the damaged location. The outer layer may be an anti-torque layer which may include binding tape, such as Z-tape used in the manufacture of composite flexible pipe. A border of this layer may remain, so that an edge of the layer may be exposed within the jacket window. For example, a one inch border may remain visible and covering and protecting undamaged stacks in the jacket window. However, those skilled in the art will appreciate that the amount of exposed outer layer may vary, and may even be completely removed from the jacket window, without deviating from the scope of the present disclosure.

In step 115, the damaged portions of the tape stacks (i.e., the damaged stacks) may be removed. In certain embodiments, only the portion which is damaged may be removed, so that what remains may be partial sections of exposed portions of the stacks that remain directly attached to the pipe (i.e., the undamaged stacks). A cutting tool may be used to remove the damaged stacks. The cutting tool may be a circular saw, a rotary cutting wheel, or any other cutting tool known in the art that may cut through the tape stacks. In certain embodiments, when removing the damaged stacks, four or more inches of undamaged stacks may be left visible within the jacket window to be manipulated. Furthermore, the cuts of adjacent damaged stacks may be made with some amount of separation or linear distance along the length of the tape stacks between where the cuts are made. Those skilled in the art will appreciate that the length of exposed tape stacks may vary to be longer or shorter than four inches without deviating from the scope of the present disclosure.

Finally, in step 120, the damage location, following removal of the damaged stacks, may be cleaned. The damage location may be cleaned with a solvent, clean compressed air, alcohol wipes, and/or any other cleaning agent or device that may remove dust and other particles and prepare the damage location for the repair. The damage location may also be dried with a moisture absorbing cloth, forced air convection (with or without heated air), or other drying means known in the art.

Figure 4:
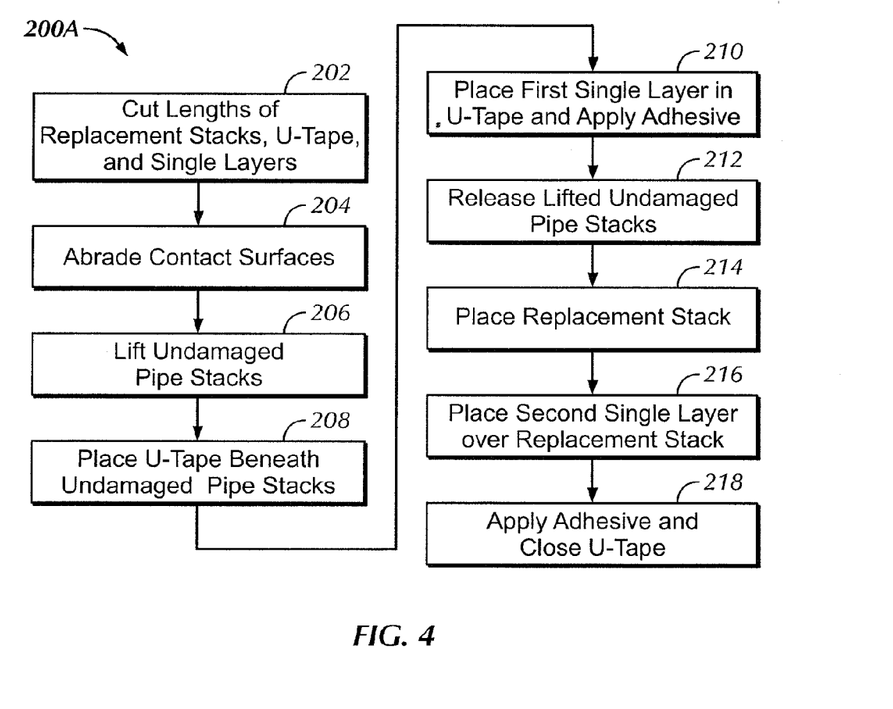

Referring now to FIG. 4, one or more embodiments of the present disclosure with respect to the installation of the replacement stacks will be described. In the exemplary embodiment detailed in FIG. 4, the process of installing replacement stacks 200A will be described.

In a first step 202, lengths of replacement stacks may be cut to size. Each damaged stack that may be removed may have a custom replacement stack cut to fit. Accordingly, the replacement stacks may fit into a void created by the removed damaged stacks. Further, lengths of U-tape may be cut. The U-tape may be a flat tape which may have a linear length, which may be a length along the length of a tape stack and a width which may be a width designed to wrap around a repaired tape stack. Each replacement stack may have one section of U-tape cut to size. The linear (i.e., axial) length of the U-tape may extend longer than the replacement stacks to which they may correspond. For example, the U-tape for a particular replacement stack may be about eight inches longer than the replacement stack it may correspond to. Additionally, lengths of single strips may be cut the same length as the U-tape. Each replacement stack may have two corresponding single strips. Those skilled in the art will appreciate that the length of the U-tape and single strips may vary without deviating from the scope of the present disclosure. Further, the U-tape and the single strips may be of different lengths, such that one may be longer than the other in length along the stack.

Next, in step 204, all contact surfaces may be abraded to allow for a clean bonding between different elements during the repair procedure. The contact surfaces may include the surfaces of the U-tape, both sides of the single strips, all sides of the replacement stacks, and surfaces of the undamaged stacks. The abrasion may be made by a physical or chemical process. Physical abrasion may be accomplished by sanding, grinding, filing, or other physical abrasion tools or methods. Chemical abrasion may be accomplished by chemicals which may etch the surface of the composite material. After abrasion, the damage location may be cleaned, as describe above, which may allow for clean contact surfaces for binding during the repair process.

Next, in step 206, the undamaged stacks may be lifted to expose the undamaged portion of pipe beneath. The length of undamaged stack to be lifted may correspond to the additional length of the U-tape beyond the length of its corresponding replacement stack. The additional length may be a distance of overlap that the U-tape and the single strips may have with the undamaged stacks. For example, as described above, a U-tape may be cut to be eight inches longer than a corresponding replacement stack, accordingly, each side of the undamaged stacks may be lifted at least four inches to accommodate the full length of the U-tape, and thereby creating a distance of overlap of four inches for each side of the undamaged stack. Accordingly, in step 208, the U-tape may be placed beneath the lifted undamaged stacks. A distance of overlap for each end of the exposed undamaged stack may exist due to the extended length of the U-tape.

Next, in step 210, a first single strip may be placed within the U-tape, beneath the lifted undamaged stack and parallel to the direction of the tape stack. Adhesive may be applied between the first single strip and the U-tape into which it may be placed. Accordingly, a bond may be formed between the first single strip and the U-tape.

In step 212, the undamaged stacks may be released. Adhesive may be applied to the under side of the undamaged stacks and/or the first single strip so that a bond may be formed between the first single strip and the undamaged stacks.

Next, in step 214, a replacement stack may be placed on the first single strip within the U-tape and between the ends of the undamaged stacks defining a void representing the removed damaged stack. Adhesive may be applied between the first single strip and the replacement stack so that a bond may be formed between the two elements. The replacement stack may be placed in the center of the U-tape so that a continuous section of repaired tape stack may be formed which may include the disconnected undamaged stacks and the replacement stack placed therebetween.

In step 216 a second single strip may be placed on the surface of the replacement stack and may extend over the surface of the undamaged stack for the distance of overlap. Adhesive may be applied between these layers so that a bond may be formed therebetween. The second single strip may be placed so that the additional length may extend in either direction for the length of the overlap.

Finally, in step 218, the U-tape may be folded over and/or closed so that a single continuous repaired tape stack may be formed. Adhesive may be applied to the inner surface of the U-tape and/or the top surface of the second single strip, thereby forming a bond between the layers.

Steps 202 through 218 may be repeated for each damaged stack.

A cross-sectional view of a repaired tape stack in accordance with embodiments of the present disclosure, and particularly process 200A, is shown in FIGS. 8, 9A-9C, and 12A-12C, which will be described below.

Figure 5:
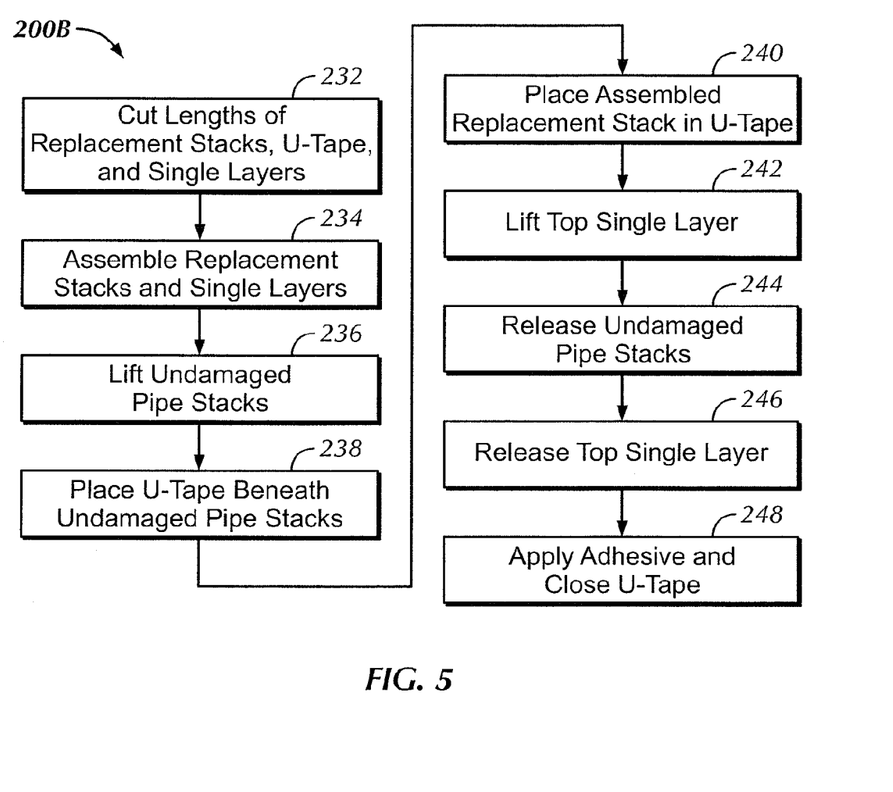

An alternative exemplary process in accordance with one or more embodiments of the present disclosure will now be discussed with reference to FIG. 5 and repair process 200B, directed to installing the replacement stacks.

In a first step 232, similar to step 202 of process 200A, replacement stacks may be cut to size. Additionally, U-tape and single strips may be cut to size for each replacement stack. The U-tape and the single strips may be cut for a distance of overlap, similar to that described above. Further, the U-tape and single strips may be the same or different lengths.

Figure 12A:
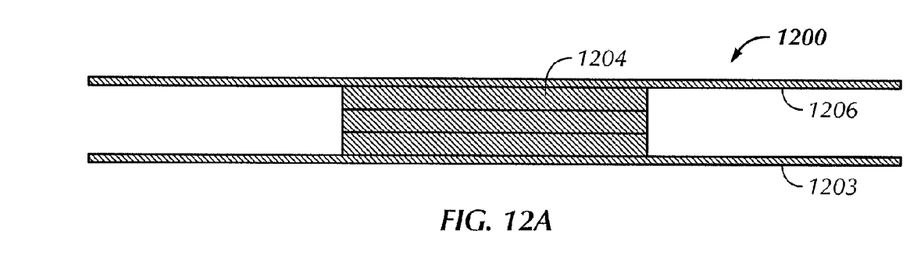
FIGS. 12A-12C show schematic cross-sectional views of a composite flexible pipe in accordance with one or more embodiments of the present disclosure.

In step 234, a replacement assembly may be assembled (see FIG. 12A). The surfaces of the replacement stack may be abraded. Further, surfaces of the single strips may be abraded. The replacement assembly may be constructed by applying an adhesive to the abraded surfaces of the replacement stack and a contact surface of the single strips. A single strip may be applied to the top and the bottom of the replacement stack, thereby forming a substantially "I" shape, in which the replacement stack may be a central body and the two single strips may extend for the distance of overlap in each direction.

In step 236, the undamaged stacks may be lifted to expose the undamaged portion of pipe as described above in step 208 of process 200A.

Next, in step 238, the U-tape may be placed beneath the lifted undamaged stack, so that the distance of overlap of the U-tape may extend under each exposed end of the undamaged stack.

In step 240, the replacement assembly constructed in step 234 may be placed in the U-tape. An adhesive may be applied to the bottom of the replacement assembly and/or the U-tape so that a bond may be formed between the two.

Figure 12B:
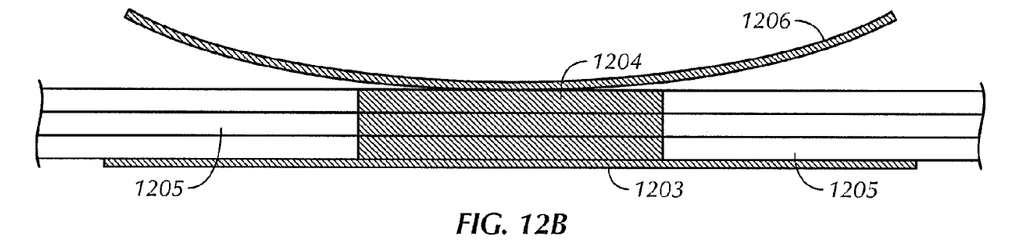

Next, in step 242, each end of the top single strip of the replacement assembly may be lifted so that the undamaged stacks may be released, in step 244 (see FIG. 12B). Then, in step 246, each end of the lifted top single strip may be released, thereby creating a continuous length of repaired tape stack, which may include the replacement assembly and the undamaged stacks (see FIG. 12C). Further, adhesive may be applied between the single strips and the lifted portions of the undamaged stack to form a bond therebetween.

Finally, in step 248, adhesive may be applied to the U-tape, and it may be sealed, to thereby create the repaired tape stack.

Steps 232-248 may be repeated for each damaged stack.

A cross-sectional view of a repaired tape stack in accordance with embodiments of the present disclosure, and particularly process 200B, is shown in FIGS. 8 and 9A-9C, which will be described below.

Figure 6:
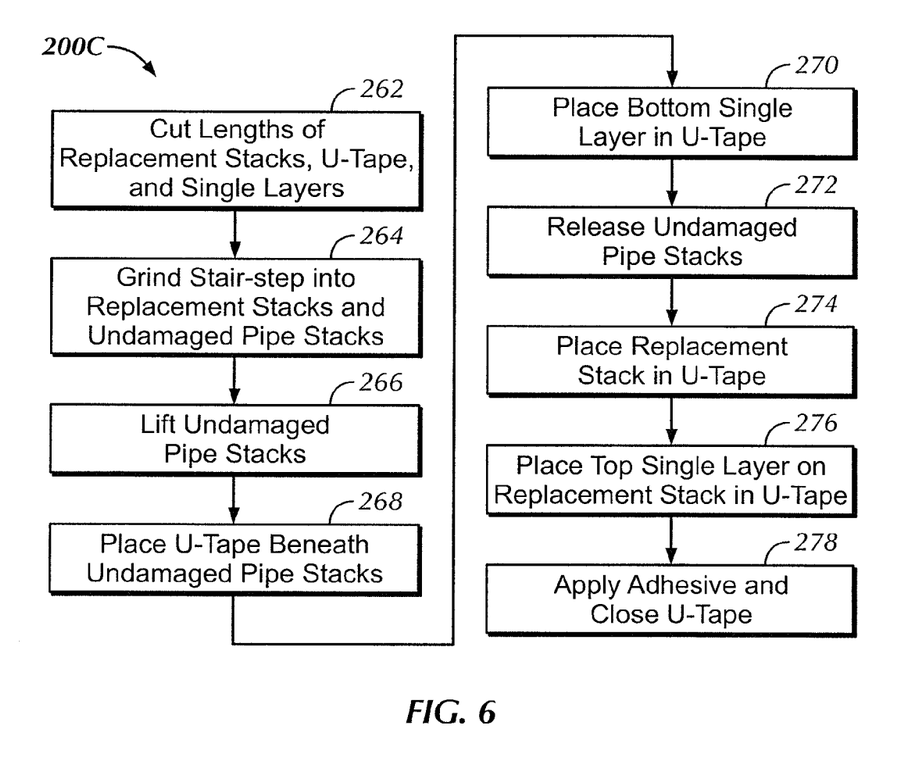

An alternative exemplary process in accordance with one or more embodiments of the present disclosure will now be discussed with reference to FIG. 6 and repair process 200C, directed to installing the replacement stacks.

In a first step 262, lengths of replacement stacks may be cut to size. Each damaged stack that may be removed may have a custom replacement stack cut to fit. The replacement stacks may be cut to a length that extends farther than the void created by the removed damaged stacks. For example, the length of the replacement stacks may be cut to be eight inches longer than the void created by removal of the damaged stacks. However, those skilled in the art will appreciate that the additional length of the replacement stacks as compared to the void may be varied without deviation from the scope of the present disclosure, and particularly is not limited to eight additional inches. Further, lengths of U-tape and single strips may be cut, as described above with respect to step 202 of process 200A. The lengths of U-tape and single strips may be longer than the length of the replacement stacks.

Figure 10A:
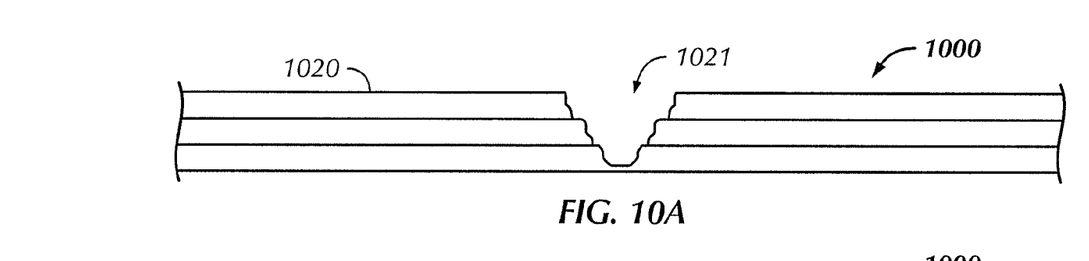
FIGS. 10A-10C show schematic cross-sectional views of a composite flexible pipe in accordance with one or more embodiments of the present disclosure.
Figure 10B:
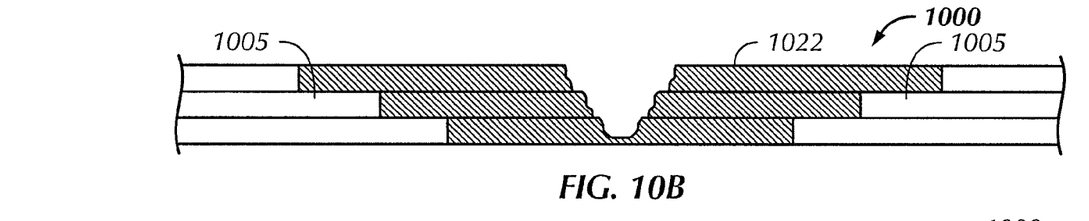
Figure 10C:
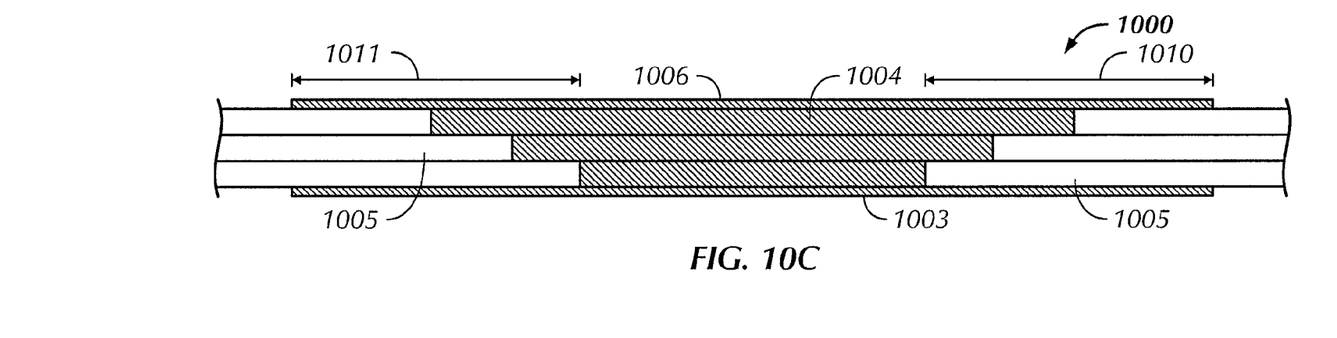

Next, in step 264, the undamaged stacks and the replacement stacks may be grinded to form stair-step engagement surfaces, as shown in FIGS. 10B and 10C. Accordingly, the surface of contact between the replacement stack and the undamaged stacks may be increased, which may allow for a stronger bond between the replacement stacks and the undamaged stacks. The replacement stacks may be grinded to match the stair-step pattern of the corresponding undamaged stacks, which may optimize the contact surfaces. The grinding may be made with a suitable grinding tool, which may grind through layers of the tape stacks.

Further, all contact surfaces may be abraded, which may allow for a secure bonding between different elements during the repair procedure. The contact surfaces may include the surfaces of the U-tape, both sides of the single strips, all sides of the replacement stacks, and surfaces of the undamaged stacks including the stair-step portions. The abrasion may be made my physical or chemical means. After abrasion, the damage location may be cleaned, as describe above, which may allow for clean contact surfaces for binding during the repair process.

Next, in step 266, the undamaged stacks may be lifted to expose the undamaged portion of pipe beneath. The length of undamaged stack to be lifted may correspond to the additional length of the U-tape beyond the length of its corresponding replacement stack. The additional length may be a distance of overlap that the U-tape may have with the undamaged stacks, as described above.

Next, in step 268, the U-tape may be placed beneath the lifted undamaged stacks, and may cover the distance over overlap.

Next, in step 270, a first single strip may be placed within the U-tape, beneath the lifted undamaged stack. Adhesive may be applied between the first single strip and the U-tape into which it may be placed. Accordingly, a bond may be formed between the first single strip and the U-tape.

In step 272, the undamaged stacks may be released. Adhesive may be applied to the under side of the undamaged stacks and/or the first single strip so that a bond may be formed between the first single strip and the undamaged stacks.

Next, in step 274, a replacement stack may be placed on the first single strip within the U-tape and between the ends of the undamaged stacks defining an area representing the removed damaged stack. The stair-step surfaces may contact. Adhesive may be applied between the first single strip and the replacement stack so that a bond may be formed between the two elements. The replacement stack may be placed in the center of the U-tape so that a continuous section of repaired tape stack may be formed which may include the disconnected undamaged stacks and the replacement stack placed therebetween. Further, adhesive may be applied between the undamaged stacks and the replacement stack, so that all of the surfaces of the stair-step may be bonded to each other.

In step 276 a second single strip may be placed on the surface of the replacement stack and may extend over the surface of the undamaged stack for the distance of overlap. Adhesive may be applied between these layers so that a bond may be formed therebetween. The second single strip may be placed so that the additional length may extend in either direction for the length of the overlap.

Finally, in step 278, the U-tape may be folded over and/or closed so that a single continuous repaired tape stack may be formed. Adhesive may be applied to the inner surface of the U-tape and/or the top surface of the second single strip, thereby forming a bond between the layers.

A cross-sectional view of a repaired tape stack in accordance with embodiments of the present disclosure, and particularly process 200C, is shown in FIGS. 10A-10C, which will be described below.

Further, with respect to exemplary processes 200A, 200B, and 200C, although the procedure may be performed in-situ, the cutting of lengths of replacement stacks, U-tape, and single strips may be preformed prior to arrival to the damage location, if the lengths desired are known in advance. Further, the replacement assemblies of procedure 200B may be assembled in advance, as well, if the dimensions are known in advance. In one or more embodiments of the present disclosure, replacement stacks and/or outer jacket repair material may be taken from a section of pipe that was manufactured to the same dimensional and material requirements as the pipe that may be repaired.

Figure 7:
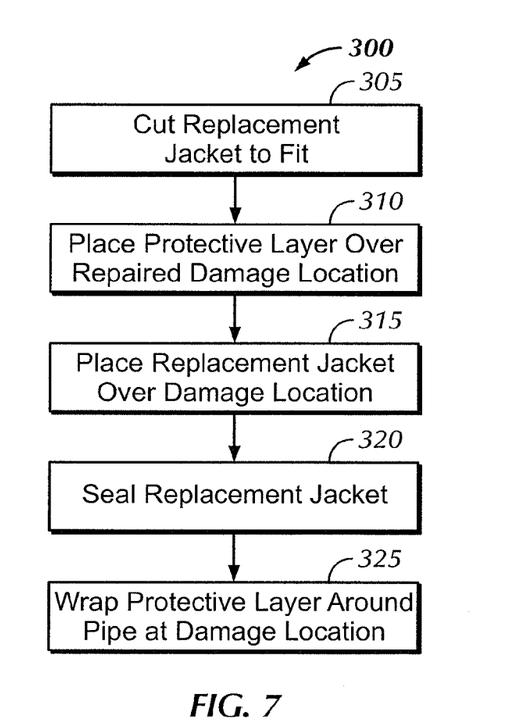

The procedure of covering of the repaired damage location 300 will now be described with reference to FIG. 7. In step 305 a replacement jacket may be cut to fit the exposed surface of the damage location, which may fit to the jacket window. This may be performed in advance if the dimensions are known prior to arrival at the damage location or at any time during the repair process. Alternatively, the damaged jacket may be used as a template to cut the replacement jacket, if available.

In step 310, a protective layer may be placed and/or sealed over the repaired damage location. The protective layer may be made of barrier tape.

In step 315, the replacement jacket may be placed over the repaired damage location. The replacement jacket may be placed in the jacket window for installation. Further, the replacement jacket may be compressed into the jacket window. The compression may be accomplished by use of a ratcheting mechanism on tie-down straps or other compressive means known in the art.

Once held in place, the jacket may be sealed to the pipe in step 320. The seal may be made by a weld, extruded material, and/or other sealing method or means. Specifically, the seams that may exist between the replacement jacket and the jacket window may be sealed. The welding may be done by a hot knife, a heat gun, torch, thermoplastic welder, or any other tool which may allow for plastic welding. After welding, the weld may be allowed to cool. When cooling, active quenching may be avoided. The extrusion may be made by an extruding gun, which may extrude plastic feedstock or other plastic or sealing material. The compression tie-down straps may then be removed. Any remaining unsealed seams may then be sealed. The compressive tie-down straps may then be reapplied to the repaired damage location to compress the jacket and stack assembly.

Finally, in step 325, a protective exterior wrap may be applied around the repaired damage location. The compressive tie-down straps may be removed prior to applying the protective exterior wrap. Further, after the protective exterior wrap may be applied, the tie-down straps may be re-installed to apply compression to the wrap, the jacket, and the stack assembly.

Figure 8:
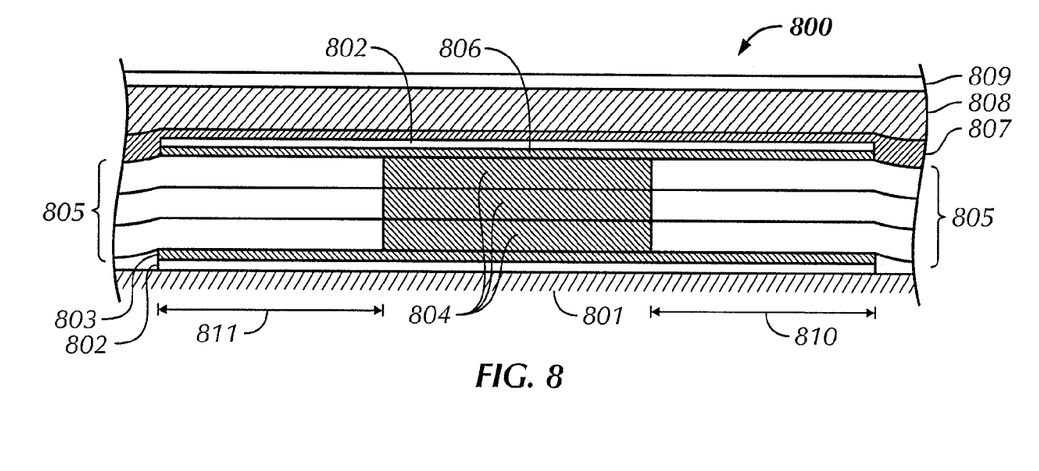
FIG. 8 shows a schematic cross-sectional view of a repaired pipe in accordance with one or more embodiments of the present disclosure.

Now referring to FIG. 8, a cross-sectional schematic of an exemplary completed repair, in accordance with one or more embodiments of the present disclosure, will be described (not shown to scale). A repaired tape stack 800 may be repaired in accordance with one or more embodiments of the present disclosure. Accordingly, a section of an undamaged pipe 801 may form the base of the repaired section. Undamaged pipe 801 may include multiple layers of a composite flexible pipe, as described above.

U-tape 802 may be the first layer in contact with the surface of undamaged pipe 801. Next, a first single strip 803 may be located on top of U-tape 802. In contact with first single strip 803 may be replacement stacks 804 and sections of undamaged stacks 805. As noted above, a distance of overlap 810 and 811 may be provided to allow for a continuous repaired tape stack and may provide structural reinforcement to the repaired tape stack. Further, distances of overlap 810 and 811 may extend the same or different distances over each side of the undamaged stacks 805. Those skilled in the art will appreciate that the first single strip 803 may be omitted without deviating from the scope of the invention.

Above replacement stacks 804 and undamaged stacks 805, a second single strip 806 may be applied. Above second single strip 806, U-tape 802 may be folded and/or sealed over the replacement stack 804, the undamaged stacks 805, and single strips 803 and 806. Next, a protective layer 807 may be applied over the stack assembly to seal the replacement stacks within the pipe.

A replacement jacket 808 may then cover the replacement stacks and the repaired region. Finally, a protective exterior wrap 809 may be applied to the surface of the pipe at the damage location to further seal and protect the repaired damage location.

Adhesive may be applied between each layer. Application of the adhesive may be preceded by abrading the surface to which the adhesive may be applied. The abrasion may be either chemical or physical abrasion.

Figure 9A:
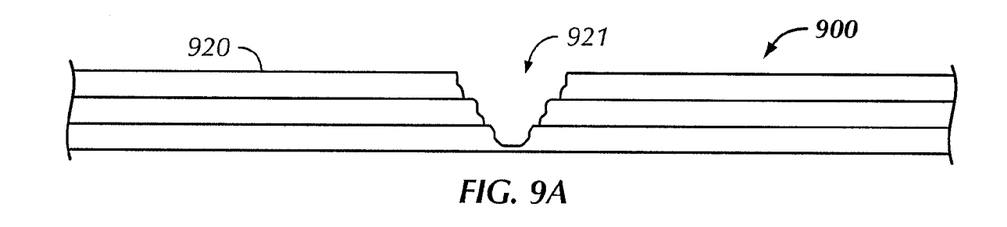
FIGS. 9A-9C show schematic cross-sectional views of a composite flexible pipe in accordance with one or more embodiments of the present disclosure.
Figure 9B:
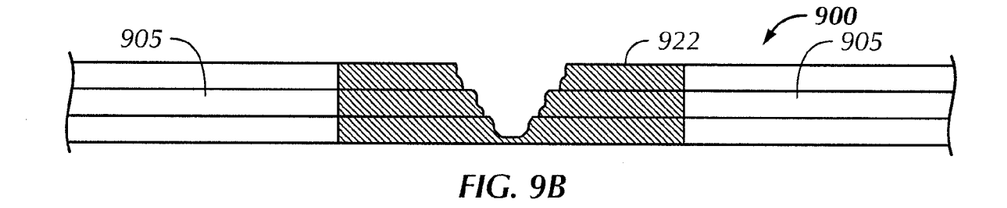
Figure 9C:
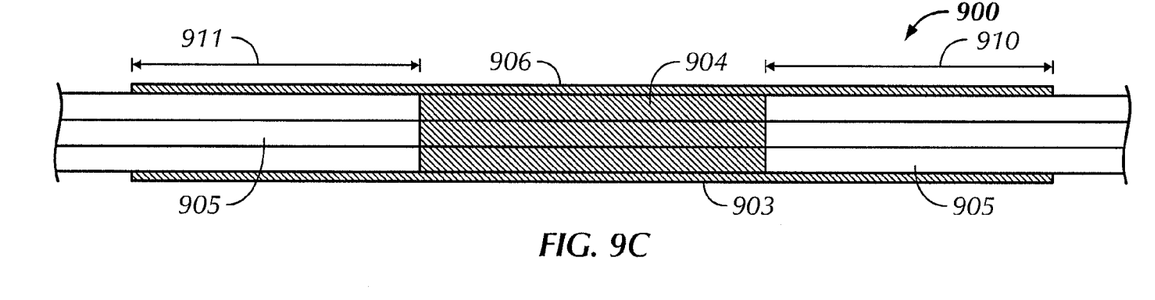

Now referring to FIGS. 9A-9C, a cross-sectional schematic of the repair process in accordance with one or more embodiments of the present disclosure is shown. Particularly, FIGS. 9A-9C may schematically represent a cross-sectional view of the repair process in accordance with processes 200A and 200B.

FIG. 9A shows a schematic of a damaged stack 900, with stacks 920. Only a damaged stack is shown, and other layers of the pipe are omitted from the schematic. Stacks 920 may have a damaged section 921, which may include damage to multiple layers of the tape stacks 920.

FIG. 9B shows a representation of the tape stack 900 during the repair process. Specifically, undamaged stacks 905 may define a region of damaged stack 922. Damaged stack 922 may be removed by processes according to one or more embodiments of the present disclosure.

FIG. 9C shows the tape stack 900 as repaired in accordance with one or more embodiments of the present disclosure. Specifically, undamaged stacks 905 and replacement stack 904 may define a continuous length of repaired tape stack 900. The repaired tape stack 900 may be bounded and supported by a first single strip 903 and a second single strip 906. Further, as shown, single strips 903 and 906 may include distances of overlap 910 and 911.

Now referring to FIGS. 10A-10C, a cross-sectional schematic of the repair process in accordance with one or more embodiments of the present disclosure is shown. Particularly, FIGS. 10A-10C may schematically represent a cross-sectional view of the repair process in accordance with process 200C.

FIG. 10A shows a schematic of a tape stack 1000, including stacks 1020 with a damaged section 1021, similar to that shown in FIG. 9A.

FIG. 10B shows a representation of the tape stack 1000 during the repair process. Specifically, undamaged stacks 1005 may define a section of damaged stack 1022. Damaged stack 1022 may be removed by processes according to one or more embodiments of the present disclosure. Also shown in FIG. 10B is the stair-step of undamaged stacks 1005.

FIG. 10C shows a repaired tape stack 1000 in accordance with one or more embodiments of the present disclosure. Specifically, undamaged stacks 1005 and replacement stack 1004 may define a continuous length of repaired tape stack 1000. The repaired tape stack 1000 may be bounded and supported by a first single strip 1003 and a second single strip 1006. Further, as shown, single strips 1003 and 1006 may include distances of overlap 1010 and 1011. Also shown in FIG. 10C is the stair-step of replacement stack 1004, which may contact the stair-step of undamaged stacks 1005.

Figure 11A:
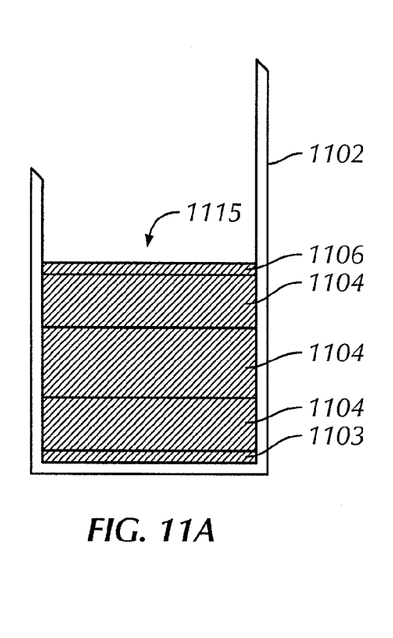
FIGS. 11A-11C show schematic cross-sectional views of a composite flexible pipe in accordance with one or more embodiments of the present disclosure.
Figure 11B:
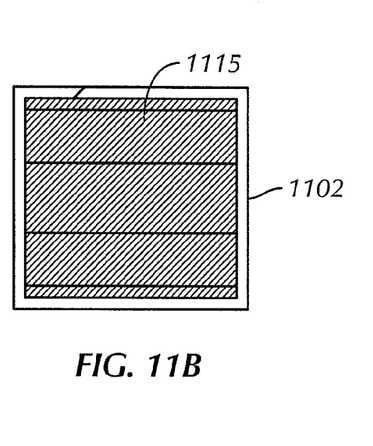
Figure 11C:
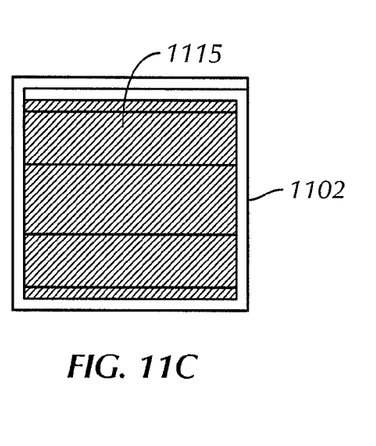

Now referring to FIGS. 11A-11C, a cross-sectional schematic of the repair process in accordance with one or more embodiments of the present disclosure is shown. Particularly, FIGS. 11A-11C may schematically represent a cross-sectional view of the repair process as viewed along the length of the tapes. Particularly, FIGS. 11A-11C show the U-tape as applied.

FIG. 11A shows a replacement stack 1115 including a bottom single strip 1103, replacement stack 1104, and a top single strip 1106. The replacement stack is placed within a U-shaped tape, 1102.

FIG. 11B shows the U-tape 1102 sealed in accordance with one or more embodiments of the present disclosure. Particularly, U-tape 1102 may be wrapped around replacement stack 1115. U-tape 1115 may be cut to length so that there is minimal increase in the height of the replacement stack 1115. In contrast, in FIG. 11C, U-tape 1102 may be fully wrapped, so as to maximize the contact surfaces. However, as shown in FIG. 11C, the height of the replacement stack may be increased. Furthermore, those skilled in the art will appreciate that other lengths of overlap and height increase may be achieved without deviating from the scope of the present disclosure.

Figure 12C:
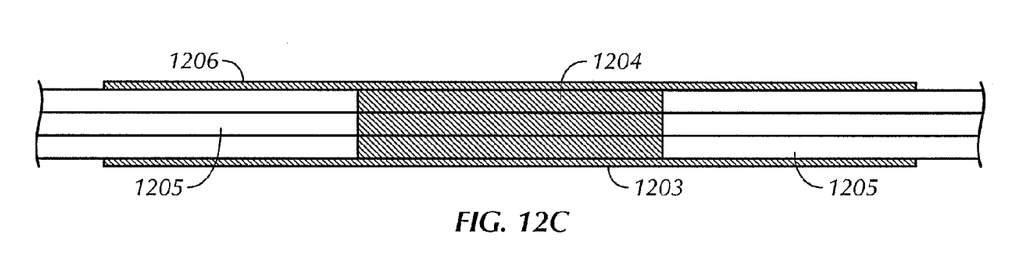

Now referring to FIGS. 12A-12C, a cross-sectional schematic of the repair process in accordance with one or more embodiments of the present disclosure is shown. Particularly, FIGS. 12A-12C may schematically represent a cross-sectional view of the repair process in accordance with process 200B.

FIG. 12A shows a cross-section of a replacement assembly 1200, which may include replacement stacks 1204, a top single strip 1206, and a bottom single strip 1203. Replacement stacks 1204, top single strip 1206, and bottom single strip 1203 may be bonded together with epoxy prior to installation.

FIG. 12B shows both ends of top single strip 1206 lifted to allow for undamaged stacks 1205 to be placed in contact with (and bonded to) bottom single strip 1203 and replacement stacks 1204. FIG. 12C shows the completed repaired stack with top single strip 1206 bonded to the top of undamaged stacks 1205.

The foregoing outlines feature several embodiments so that those skilled in the art may better understand the aspects of the present disclosure. Those skilled in the art will appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

Advantageously, embodiments disclosed herein allow for in-situ repair of composite pipe, whereas damaged composite pipe previously would have to be completely replaced and damaged metallic pipe could advantageously have been weld-repaired. Accordingly, embodiments disclosed herein allow certain kinds of composite pipe (e.g., composite pipe made of tape stacks) to be closer to equal level with metallic pipe in terms of reparability, thus allowing more widespread adoption of such composite pipe manufactured from of helically-wrapped stacks of laminated strips of material.

Advantageously, a repair performed in accordance with one or more embodiments disclosed herein may be performed in-situ. Further, the down time of a rig may be reduced substantially by the ability to perform the disclosed procedures in-situ with readily available tools and parts.

Advantageously, as at most two single strips may be added to the tape stack during the repair process, there may only be a slight increase in the diameter of the pipe at the damaged location. The small increase may allow for the pipe to function as if it was undamaged, and may allow for smooth and continuous pipe sections that may be as strong as or stronger than the original undamaged pipe. Further, a binding material, such as epoxy, may be used, and additional single strips may be added, along with a large surface area of contact between the replacement stack and the undamaged stack, the strength of the composite pipe may be as strong as or stronger than the original undamaged pipe.

While the disclosure has been presented with respect to a limited number of embodiments, those skilled in the art, having benefit of this disclosure, will appreciate that other embodiments may be devised which do not depart from the scope of the present disclosure. Accordingly, the scope of the invention should be limited only by the attached claims.

What is claimed is:

1. A method of repair comprising:
   removing damaged stacks from a flexible fiber-reinforced pipe comprising a plurality of helically-wrapped stacks of laminated strips of material from a damage location;
   enhancing a direct contact surface of replacement stacks to be installed at the damage location to increase bond ability of the replacement stacks;
   applying an adhesive to the surface of the replacement stacks;
   installing the replacement stacks to the damage location; and
   binding the replacement stacks to remaining existing stacks with the applied adhesive.

2. The method of claim 1, further comprising: installing a replacement jacket over the replacement stacks.

3. The method of claim 1, further comprising:
   installing a first single strip of material below the replacement stacks, wherein the length of the first single strip of material extends to a first distance of overlap; and
   installing a second single strip of material above the replacement stacks, wherein the length of the second single strip of material extends a second distance of overlap.

4. The method of claim 3, wherein installing replacement stacks comprises:
   disposing U-tape below the undamaged portions and covering the damage location for a width of one stack; and
   sealing the U-tape around the first single strip of material, the replacement stack, and the second single strip of material.

5. The method of claim 4, further comprising:
   abrading surfaces of contact of at least one of the U-tape, the first single strip of material, and the second single strip of material; and
   applying an adhesive to one or more of the abraded surfaces to allow for binding between the contact surfaces.

6. The method of claim 1, further comprising:
   grinding at least one exposed end of the existing stacks to form a stair-step surface; and
   grinding at least one end of the replacement stack to form a corresponding stair-step surface to correspond with the stair-step surface of the existing stacks.

7. The method of claim 1, wherein the abrading contact surfaces comprises at least one of physical and chemical abrasion.

8. The method of claim 1, further comprising:
   cutting away an exterior jacket of the pipe around the damage location;
   removing sections of damaged stacks from the damage location; abrading an exposed surface of the damage location;
   installing cover U-tape in the damage location;
   laying the replacement stacks in the cover U-tape; and
   wrapping the replacement stacks with the U-tape.

9. The method of claim 8, wherein the exposed surface of the damage location comprises at least four inches of an undamaged stack of the pipe.

10. The method of claim 1, wherein the installing the replacement jacket comprises plastic welding the replacement jacket to a surface of the pipe.

11. The method of claim 1, wherein the installing the replacement jacket comprises extruding a plastic material to seal the replacement jacket to a surface of the pipe.

12. The method of claim 1, further comprising covering the pipe around the damage location with a protective layer.

13. The method of claim 12, wherein the protective layer comprises ethylene propylene copolymer tape.

14. The method of claim 1, wherein the installing replacement stacks comprises:
    bending and securing undamaged stacks of the pipe away from the damage location;
    applying epoxy to the replacement stacks and to undersides of the bent undamaged stacks;
    releasing the bent undamaged stacks; and
    applying epoxy to the replacement stacks and to upper sides of the released undamaged stacks.

15. The method of claim 1, wherein the repair is performed in-situ.

16. The method of claim 1, further comprising:
    removing at least one of tensile loads, compression loads, and internal pressure loads from the pipe prior to performing the repair.

17. The method of claim 1, further comprising applying a barrier tape to undamaged stacks exposed by the removed damaged portions of the damaged stacks prior to installing the replacement stacks.

18. The method of claim 1, further comprising applying a barrier material to the installed replacement stacks prior to installing the replacement jacket.

19. The method of claim 1, wherein the replacement stacks comprise protective tape wrapped there around.

20. A method of repair comprising:
    removing damaged stacks from a flexible fiber-reinforced pipe comprising a plurality of helically-wrapped stacks of laminated strips of material;
    installing a first single strip in a void created by the removed damaged stacks;
    enhancing a direct contact surface of a replacement stack to be installed at a location previously occupied by the damaged stacks to increase bond ability of the replacement stack;
    installing the replacement stack in a void created by the removed damaged stacks; and
    installing a second single strip over the replacement stack.

21. The method of claim 19, further comprising installing U-tape around the first single strip, the replacement layer, and the second single strip.

* * * * *